Figure 1:
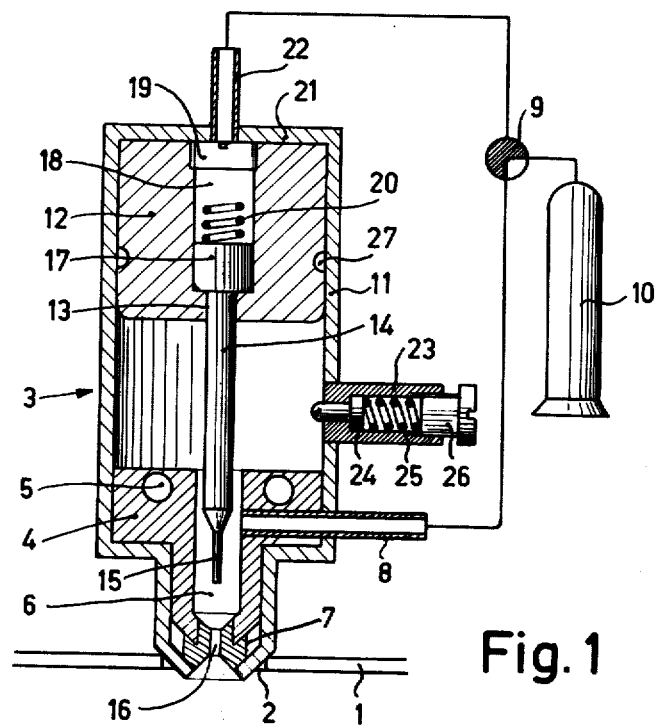

United States Patent [19]
van der Sluys et al.

[11] 3,913,899
[45] Oct. 21, 1975

[54] DEVICE FOR SUPPLYING OXIDANT FROM A PRESSURIZED RESERVOIR TO A REACTION RESERVOIR

[75] Inventors: Willem Ludovicus Nicolaas van der Sluys; Maarten Scheffer, both of Eindhoven, Netherlands

[73] Assignee: U.S. Philips Corporation, New York, N.Y.

[22] Filed: Oct. 3, 1974

[21] Appl. No.: 511,661

[30] Foreign Application Priority Data
Oct. 15, 1973 Netherlands ................. 7314132

[52] U.S. Cl. ............ 266/34 T; 23/252 R; 126/263
[51] Int. Cl.² ........................................... F24J 1/00
[58] Field of Search .............. 23/252 R, 285; 75/66; 266/34 T; 126/263

[56] References Cited
UNITED STATES PATENTS
| | | | |
|---|---|---|---|
| 1,981,169 | 11/1934 | Gibson et al. | 23/252 R X |
| 3,356,492 | 12/1967 | Delange et al. | 23/252 R |

*Primary Examiner*—Gerald A. Dost
*Attorney, Agent, or Firm*—Frank R. Trifari; David R. Treacy

[57] ABSTRACT

A device for supplying an oxidant to a reaction reservoir containing a liquid metal which chemically reacts with the oxidant. A piston is slidable over a needle holder between two abutments. In the closed condition, a spring between the needle holder and the piston exerts a force on the needle holder to hold a needle in the discharge opening. An oxidant supply line opens into a cylinder on both sides of the piston via a 3-way valve for alternative connection.

2 Claims, 2 Drawing Figures

U.S. Patent   Oct. 21, 1975   3,913,899

DEVICE FOR SUPPLYING OXIDANT FROM A PRESSURIZED RESERVOIR TO A REACTION RESERVOIR

The invention relates to a device for supplying an oxidant from a first reservoir, in which the oxidant is present under pressure, to a reaction reservoir containing a metal or mixture of metals which is liquid at the operating temperature and which chemically reacts with the oxidant while developing heat. The device is provided with a discharge piece which can be connected to an opening in the wall of the reaction reservoir and which comprises a supply duct which connects with a discharge opening of smaller diameter, the duct having arranged therein a needle holder which is axially movable therein and which supports a needle which is capable of least substantially closing the discharge opening.

Supply devices of the kind forming the subject of the present invention are used, for example, in chemical heating systems such as described in U.S. Pat. No. 3,662,739, issued May 16, 1972 and in which a gaseous oxidant reacts with liquid metals or a mixture of liquid metals while developing large quantities of heat. Chemical reactions which produce large quantities of heat are the reactions between metals and halogens or halogen compounds.

Known examples in this respect are the reactions between sodium and chlorine and between lithium and sulfur hexafluoride.

The reaction temperature of this kind of reaction usually amounts to approximately 800°C. When this kind of reaction is performed, the halogen or halogen compound in the gaseous state, i.e. the oxidant, is fed into the reaction vessel which is completely or partly filled with the liquid metal. The quantity of heat produced is controlled by controlling the quantity of oxidant supplied.

The introduction of the gaseous oxidant into a reaction vessel containing liquid metal at a temperature of 800°C is extremely difficult. On the one hand, the gaseous oxidant can readily react with the material of the discharge piece if the temperature locally becomes too high. On the other hand, liquid metals such as lithium and sodium thoroughly moisten the construction material of the discharge piece, which may cause a thin film of these metals to be formed in the discharge opening. This thin film reacts with the oxidant supplied. All this can cause severe attack as well as clogging of the discharge opening.

The object of the invention is to provide a device by means of which the supply of oxidant can be effected without such problems. According to the invention a needle holder is provided with a piston which is slidable over the needle between two abutments, a spring acting between the needle holder and the piston so as to exert a force on the needle holder in the direction of the discharge opening in the closed condition. The piston is movable in a cylinder, one end of which connects with the discharge piece, its other end being closed by an end plate. An oxidant supply line communicates with the end plate as well as the discharge piece, a control unit being provided by means of which the connection between these supply lines and the first reservoir can be closed or opened.

An oxidant supply device is thus obtained which has a compact construction, cannot be clogged and can be properly controlled using the oxidant as the control medium.

In a further preferred embodiment, a spring-loaded stop pawl projects through the cylinder wall, the pawl engaging in a groove in the piston surface when the piston is in its lowermost position.

Figure 2:
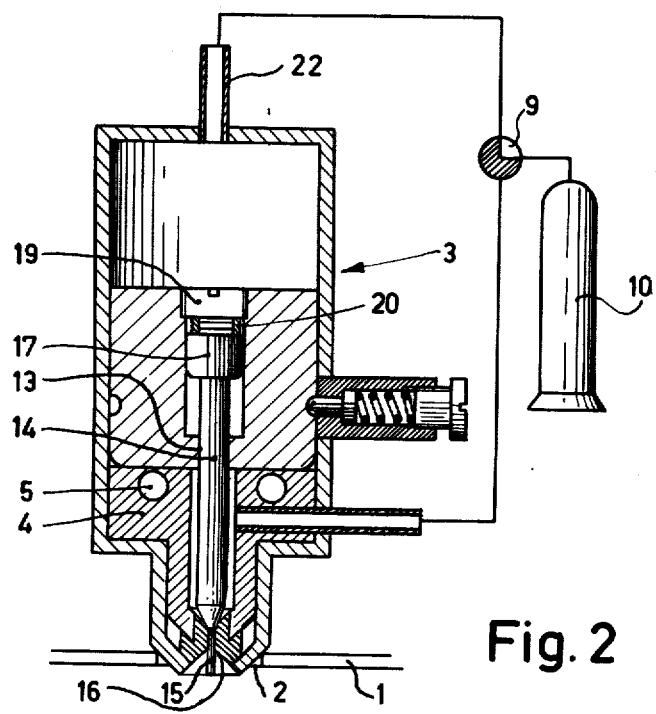

The inveniton will be described in detail hereinafter with reference to the drawing;

FIGS. 1 and 2 diagrammatically show a device for the supply of an oxidant to a reaction reservoir in the opened and closed position, respectively.

The reference 1 in the drawing denotes the wall of a reaction reservoir containing a liquid metal such as lithium. The wall 1 is provided with an opening 2.

A supply device for oxidant is denoted in its entirety by the reference 3. This device comprises a copper block 4 which is provided with cooling ducts 5 and a discharge duct 6 for the oxidant. This discharge duct 6 opens into an exchangable nozzle 7 having an opening 16 of smaller diameter.

The block 4 also has connected thereto a supply line 8 which can be made to communicate, by way of a three-way valve 9, with a reservoir 10 containing oxidant, for example, sulfur hexafluoride.

A piston 12 is arranged to be movable in a cylinder 11. The piston 12 is provided with a boring 13 in which a needle holder 14 is slidably arranged. On its side facing the nozzle 7 the needle holder 14 supports a needle 15 having a diameter which is only slightly smaller than that of the opening 16 of the nozzle 7.

The needle holder 14 is provided on its upper side with an abutment 17 which is situated in a space 18 in the piston 12 which is closed on the upper side by a bolt 19. A pressure spring 20 is arranged between the abutment 17 and the bolt 19.

The cylinder 11 is closed on its upper end by an end plate 21 having connected thereto a supply line 22 which can be made to communicate, by way of the three-way valve 9, with the reservoir 10.

The cylinder 11 is provided with a cylindrical portion 23 accommodating a stop pawl 24 which is pressed by a pressure spring 25. The tension of the spring 25 can be controlled by means of an adjusting screw 26.

When the piston 12 is in its lowermost position, the stop pawl 24 engages in a groove 27 provided in the surface of the piston 12.

The operation of this device is as follows. In the closed condition - i.e. the condition in which no oxidant is injected into the reactor - the needle 15 is situated in the discharge opening 16, and this opening is maintained closed by the conical lower end of the needle holder 14.

The force exerted by the needle holder to close the opening is determined by the spring 20 which is then compressed by the bolt 19. As is shown in FIG. 2, in this position the piston is kept in place by the stop pawl 24.

If oxidant is to be admitted from reservoir 10 into the reaction reservoir, the valve 9 is set to a position in which oxidant can flow into the line 8 and further into the space below the piston 12. Because of the pressure exerted by the oxidant, the piston 12 is forced upwards, the stop pawl 24 then being pushed aside.

The piston 12 can initially move upwards freely before the abutment 17 contacts the piston. The needle 15 will usually be rigidly positioned in the discharge opening 16. The impact of the piston 12 on the abutment 17, however, will be so heavy that the needle is forced loose from the discharge opening, after which the needle holder 14 moves upwards with the piston 12. The discharge opening is thus cleared and the oxidant can flow into the reaction reservoir.

The temperature of the discharge opening should not become too high as otherwise the construction material will be attacked by the oxidant. Therefore, a copper block 4 is fitted around the discharge opening, said block comprising cooling ducts 5 through which cooling medium, for example, air, water or some other cooling liquid is passed.

When the supply of oxidant to the reaction reservoir is to be stopped, the valve 9 is turned such that a connection is established between reservoir 10 and line 22. Oxidant then flows under pressure above the piston 12, and the latter is pushed down. The piston 12 initially moves alone and subsequently, after abutment of the bolt 19 against the spring 20, the needle holder 14 is taken along. The piston continues to move until the stop pawl 24 snaps into the groove 27; at this instant the needle is situated in the discharge opening 16 and the conical needle end bears on its seat such that the opening is closed. The oxidant pressure can subsequently be relieved.

What is claimed is:

1. In a device for supplying an oxidant from a first reservoir, in which the oxidant is present under pressure, to a reaction reservoir containing a metal or mixture of metals, which is liquid at the operating temperature and which chemically reacts with the oxidant while developing heat, the device having a discharge piece which can be connected to an opening in the wall of the reaction reservoir and which comprises a supply duct which connects with a discharge opening of smaller diameter, the duct having arranged therein a needle holder which is axially movable therein and which supports a needle which is capable of at least substantially closing the discharge opening, the improvement wherein the device comprises a piston slidable over the needle holder between two abutments, a spring acting between needle holder and piston so as to exert a force on the needle holder in the direction of the discharge opening in the closed condition, a cylinder within which the piston is movable, one end of which cylinder connects with the discharge piece duct, its other end being closed by an end plate, an oxidant supply line communicating with the end plate as well as the discharge piece, and a control unit by means of which the communicating connections between these supply lines and the reservoir can be closed or opened.

2. A device as claimed in claim 1, comprising a spring-loaded stop pawl projecting through a wall of the cylinder, the piston surface having a groove for engagement by the pawl when the piston is in its lowermost post.

* * * * *